US007990275B1

(12) United States Patent
Milanovich et al.

(10) Patent No.: US 7,990,275 B1
(45) Date of Patent: Aug. 2, 2011

(54) FUEL TANK PRESSURE INDICATOR, INCLUDING CAP AND CONTAINER INTERFACE PRESSURE INDICATOR

(76) Inventors: Philip John Milanovich, Phoenix, AZ (US); John Kostin Milanovich, Bozeman, MT (US)

( * ) Notice: Subject to any disclaimer, the term of this patent is extended or adjusted under 35 U.S.C. 154(b) by 0 days.

(21) Appl. No.: 12/652,370

(22) Filed: Jan. 5, 2010

Related U.S. Application Data

(60) Provisional application No. 61/193,876, filed on Jan. 5, 2009.

(51) Int. Cl.
*G08B 13/14* (2006.01)
*H04Q 5/22* (2006.01)
*C02F 1/00* (2006.01)

(52) U.S. Cl. .................. 340/626; 340/572.1; 340/572.9; 340/10.1; 340/426.15; 210/741

(58) Field of Classification Search ........................ None
See application file for complete search history.

(56) References Cited

U.S. PATENT DOCUMENTS

| | | | | |
|---|---|---|---|---|
| 5,105,663 | A | 4/1992 | Kuhlen | |
| 5,146,783 | A | 9/1992 | Jansche et al. | |
| 5,234,122 | A * | 8/1993 | Cherng | 220/211 |
| 5,886,266 | A | 3/1999 | Stiller et al. | |
| 6,571,778 | B2 | 6/2003 | Herm et al. | |
| 6,739,183 | B1 * | 5/2004 | Kestly | 73/114.18 |
| 6,822,565 | B2 | 11/2004 | Thomas et al. | |
| 7,023,340 | B2 * | 4/2006 | Egli et al. | 340/545.6 |
| 7,051,718 | B2 | 5/2006 | Tsuruta | |
| 7,140,235 | B2 | 11/2006 | McLain et al. | |
| 7,221,363 | B2 | 5/2007 | Roberts et al. | |
| 7,409,852 | B2 * | 8/2008 | Herzog et al. | 73/49.2 |
| 2003/0047517 | A1 * | 3/2003 | Schoess | 210/741 |
| 2004/0215407 | A1 * | 10/2004 | Thielman et al. | 702/55 |
| 2005/0191537 | A1 * | 9/2005 | Belchuk | 429/35 |
| 2005/0220633 | A1 * | 10/2005 | Hunsberger et al. | 417/279 |
| 2010/0253491 | A1 * | 10/2010 | Grossman | 340/426.11 |

FOREIGN PATENT DOCUMENTS

| | | |
|---|---|---|
| DE | 20301168 | 4/2003 |
| KR | 200308957 | 11/2003 |

* cited by examiner

*Primary Examiner* — Toan N Pham
*Assistant Examiner* — Fekadeselassie Girma
(74) *Attorney, Agent, or Firm* — Swift Law Office; Stephen Christopher Swift

(57) ABSTRACT

A pressure indicator for a motor vehicle (or other) fuel tank, that will indicate when pressure at the cap/container interface or vapor pressure in the tank drops below a predetermined level, which will normally mean that the fuel cap is not tightly secured to the tank's opening. The cap/container interface or vapor pressure will be detected by sensors in a rubber gasket (either in the cap or in the tank's opening that the cap fits over) or in a washer for the fuel cap. When the sensors detect a pressure below the predetermined level, BLUE TOOTH (or other appropriate) technology will be used to send a signal to a receiver (preferably in a key ring attachment) that will cause a red light to flash (or other appropriate visual, audio or tactile notice). The light may also flash when the cap is temporarily removed for refueling.

17 Claims, 6 Drawing Sheets

FUEL TANK PRESSURE INDICATOR, INCLUDING CAP AND CONTAINER INTERFACE PRESSURE INDICATOR

CROSS REFERENCE TO RELATED APPLICATION

This application is based on and claims the benefit of Provisional Patent Application Ser. No. 61/193,876, filed Jan. 5, 2009, which is incorporated herein by reference.

BACKGROUND OF THE INVENTION

1. Field of the Invention

The present invention relates to cap/container interface or vapor pressure indicators for fuel tanks, with sensors located in the cap for the fuel tank, in an opening of the fuel tank that the cap fits over, or in another part of the fuel tank.

2. Description of the Prior Art

Millions of gallons of fuel are lost each year due to ill-fitting fuel caps. Losses may be caused by evaporation, expansion of the fuel as the fuel tank heats up when a vehicle is in operation, splashing, etc. The vehicle's fuel pump may loose efficiency when the fuel cap is loose. Fuel may not feed properly and efficiently into injectors or carburetors. Loose fitting fuel caps may it more difficult for fuel feeding systems to get fuel to the combustion chambers with a proper air and fuel mixture. As a result, motors become less efficient, and deliver less energy for the fuel used. Motors generate excessive heat, due to inefficient or incomplete combustion. Motors running on an inefficient fuel mixture have more friction because of increased heat and increased particulate matter resulting from incomplete combustion. All of these factors result in decreased mileage, and in increased emissions and air pollutants. There have been previous inventions for detecting when a tank has a leak or is empty, but none that are equivalent to the present invention.

U.S. Pat. No. 5,105,663, issued on Apr. 21, 1992, to Ernst Kuhlen, discloses an apparatus and method for measuring low fuel level in a fuel tank, rather than low cap/container interface or vapor pressure, as in the instant invention.

U.S. Pat. No. 5,146,783, issued on Sep. 15, 1992, to Walter Jansche, Erich Zabler and Anton Dukart, discloses a liquid container hydrostatic level gauge, which uses a differential pressure sensor to determine how much fuel is left, rather then low cap/container interface or vapor pressure as in the instant invention.

U.S. Pat. No. 5,886,266, issued on Mar. 23, 1999, to Rudolf Stiller, Andreas Maennchen and Norbert Schmidt, discloses a pressure sensor that is inserted into a fuel tank, to detect low pressure that indicates a leak in the tank. The instant invention is distinguishable, in that it sends a warning signal to an outside device, such as a receiver on a key ring.

U.S. Pat. No. 6,571,778, issued on Jun. 3, 2003, to Thomas Herm and Frank Kutzner, discloses a method for testing the leak-tightness of a vehicle's fuel tank, by detecting the tank's internal pressure, and making adjustments for changes in the vehicle's speed.

U.S. Pat. No. 6,822,565, issued on Nov. 23, 2004, to Keith A. Thomas, Timothy A. Kearns and Bruce R. Davis, discloses a wireless gauge alert that sends a signal to a receiver, causing a user notification signal to be generated, when certain conditions within a liquid fuel or pressure tank are present, such as the tank being near empty, or pressure in the tank being low. However, it does not disclosure the placement of a pressure sensor in a motor vehicle fuel cap or tank opening, or a blinking light on a key chain attachment as a user notification signal, as in the instant invention.

U.S. Pat. No. 7,051,718, issued on May 30, 2006, to Masafumi Tsuruta, discloses a fuel vapor leak check module, with housing that is close to a canister by inserting a canister port into the canister.

U.S. Pat. No. 7,140,235, issued on Nov. 28, 2006, to Kurt D. Mc Lain and Michael J. Pitsch, discloses a leak detection system for a vehicle fuel tank, including a sensor that generates a pressure signal.

U.S. Pat. No. 7,221,363, issued on May 22, 2007, to John K. Roberts et al., discloses a rear view mirror assembly, causing various information about a vehicle's status to be displayed in its rear view mirror.

U.S. Patent Application Publication No. 2004/0215407, published on Oct. 28, 2004, to Jeffrey L. Thielman and Rhonda L. Wilson, discloses an apparatus and method for integrating a fuel supply and a fuel level sensing pressure sensor.

German Patent No. 20301168, published on Apr. 17, 2003, to PROPAN RHEINGAS GMBH & CO. KG., discloses a monitoring system for fluid gas tanks having a pressure and content sensor and a wireless connection to a central office. (Unfortunately, only the English abstract and the drawing were available at the U.S. Patent & Trademark Office.)

South Korean Patent No. 200308957, published on Nov. 22, 2003, inventor S. Y. Lee, discloses an apparatus and method for alerting the driver of low pressure in the fuel tank. (Unfortunately, only the English abstract and the drawing were available at the U.S. Patent & Trademark Office.)

None of the above inventions and patents, taken either singly or in combination, is seen to describe the instant invention.

SUMMARY OF THE INVENTION

The present invention is a pressure indicator for a motor vehicle (or other) fuel tank, that will indicate when cap/container interface pressure or vapor pressure in the tank drops below a predetermined level, which will normally mean that the fuel cap is not tightly secured to the tank's opening. The pressure will be detected by sensors in a rubber gasket (in the cap, in the tank's opening that the cap fits over, or in another part of the tank), in a washer for the cap, or in the cap itself. When the sensors detect a pressure below the predetermined level, BLUETOOTH® (or other appropriate) technology will be used to send a signal to a receiver (preferably in a key ring attachment) that will cause a red light to flash (or other appropriate visual, audio or tactile notice). (The light may also flash when the cap is temporarily removed for refueling.) Alternatively, visual indicators in or upon the cap itself may indicate that there is an inadequate seal.

Accordingly, it is a principal object of the invention to provide a means for detecting improper contact between the closing device (e.g., cap) and the containing device (e.g., tank).

It is another object of the invention to provide a means for detecting a leak in a motor vehicle fuel tank.

It is a further object of the invention to provide a means for detecting a drop in vapor pressure in a motor vehicle fuel tank.

Still another object of the invention is to provide a means for detecting an inadequate sealing of any fuel tank.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

The present invention is a fuel tank pressure indicator, combining a sensor/transmitter in a fuel tank cap or the fuel tank itself, with a receiver/indicator, preferably in a key ring attachment. In the preferred embodiments, there are two versions of the sensor/transmitter that can be combined with any one of four versions of the receiver/indicator, to form a total of eight preferred embodiments. The first preferred embodiment combines the first sensor/transmitter with the first receiver/indicator. The second preferred embodiment combines the first sensor/transmitter with the second receiver/indicator. The third preferred embodiment combines the first sensor/transmitter with the third receiver/indicator. The fourth preferred embodiment combines the first sensor/transmitter with the fourth receiver/indicator. The fifth preferred embodiment combines the second sensor/transmitter with the first receiver/indicator. The sixth preferred embodiment combines the second sensor/transmitter with the second receiver/indicator. The seventh preferred embodiment combines the second sensor/transmitter with the third receiver/indicator. The eighth preferred embodiment combines the second sensor/transmitter with the fourth receiver/indicator.

Figure 1:
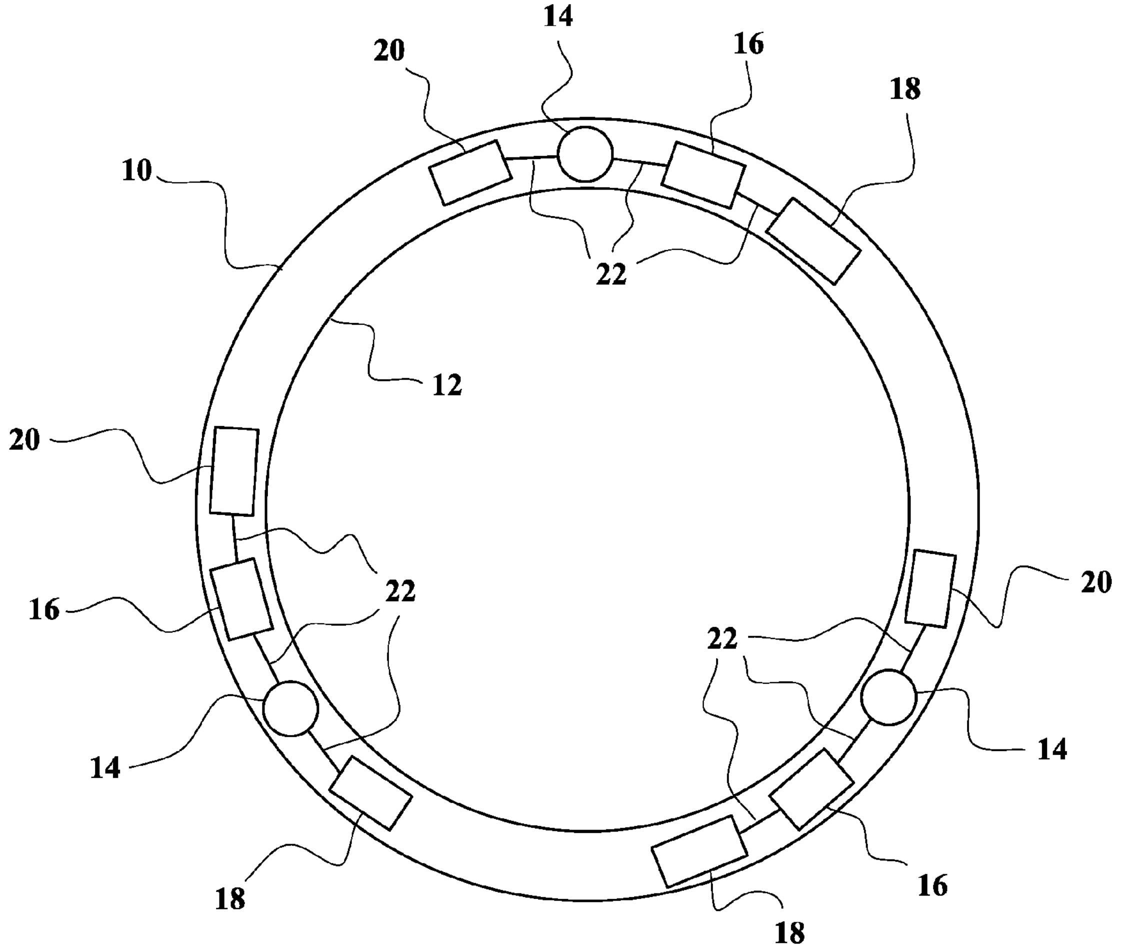
FIG. 1 is a schematic diagram of the first sensor/transmitter used in the first through fourth embodiments of the invention.

FIG. 1 is a schematic diagram of the first sensor/transmitter 10 used in the first through fourth embodiments of the invention, which may be used in the cap of a fuel tank, including a rubber gasket 12, in which are imbedded cap/container interface pressure sensors or vapor pressure sensors 14, processing chips 16, BLUETOOTH (or other suitable) transmitters 18, batteries 20, and wires 22. (Alternatively, the sensors, processing chips, transmitters, batteries and wires may be imbedded in a washer for the cap of the fuel tank.) The processing chips cause the transmitters to send radio frequency (or other) signals when the sensors detect cap/container interface or vapor pressure below a predetermined level, as when there is a leak in the fuel tank, or the cap has been removed for refueling or is not properly sealed. The batteries supply power to the sensors, the processing chips, and the transmitters. The wires electrically connect the batteries, the sensors, the processing chips, and the transmitters. (The batteries, processing chips, transmitters and wires may be housed outside the gasket or washer.)

Figure 2:
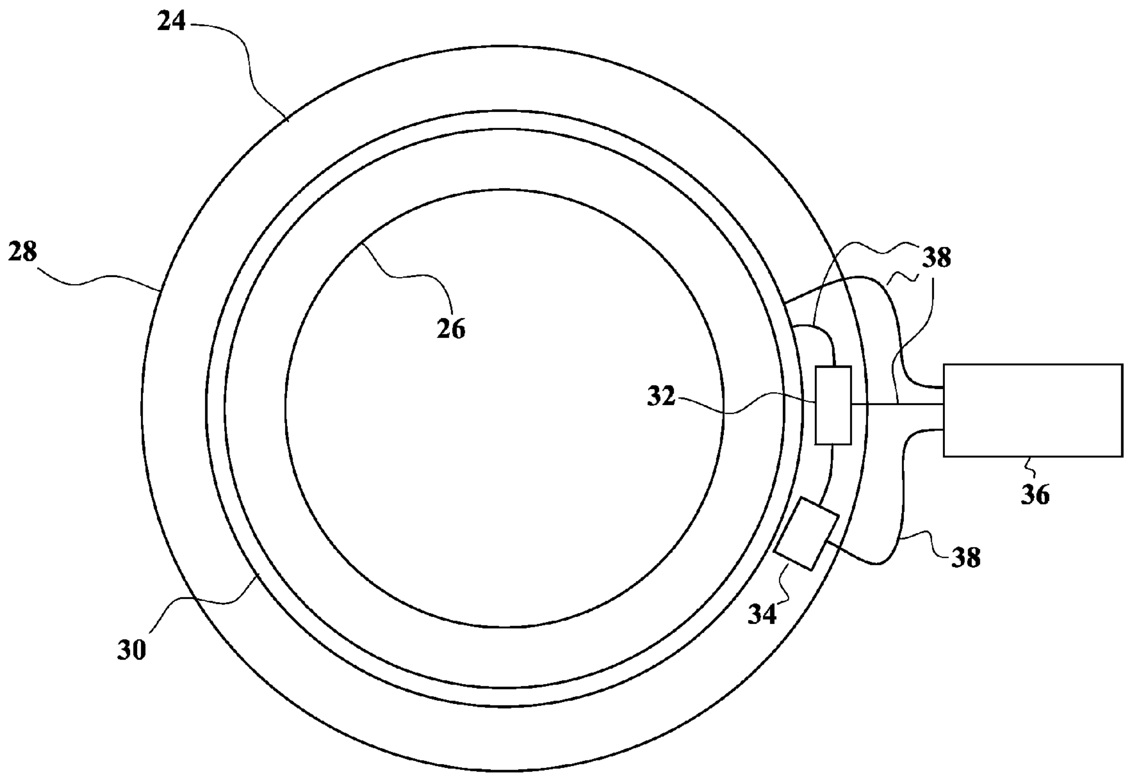
FIG. 2 is a schematic diagram of the second sensor/transmitter used in the fifth through eighth embodiments of the invention.

FIG. 2 is a schematic diagram of the second sensor/transmitter 24 used in the fifth through eighth embodiments of the invention, which may be used in the opening adjacent to the cap or elsewhere in a fuel tank, including an inner rubber gasket 26, an outer rubber gasket 28, a single circular cap or vapor pressure sensor 30, a processing chip 32, a BLUETOOTH (or other suitable) transmitter 34, a battery 36 (which may be a motor vehicle's storage battery), and wires 38. As before, the processing chip causes the transmitter to send a radio frequency (or other) signal when the sensor detects cap/container interface pressure or vapor pressure below a predetermined level, as when there is a leak in the fuel tank, or the cap has been removed for refueling or is not properly sealed. The battery supplies power to the sensor, the processing chip, and the transmitter. The wires electrically connect the battery, the sensor, the processing chip, and the transmitter. (The processing chip and the transmitter may be housed outside the gasket.)

Figure 3:
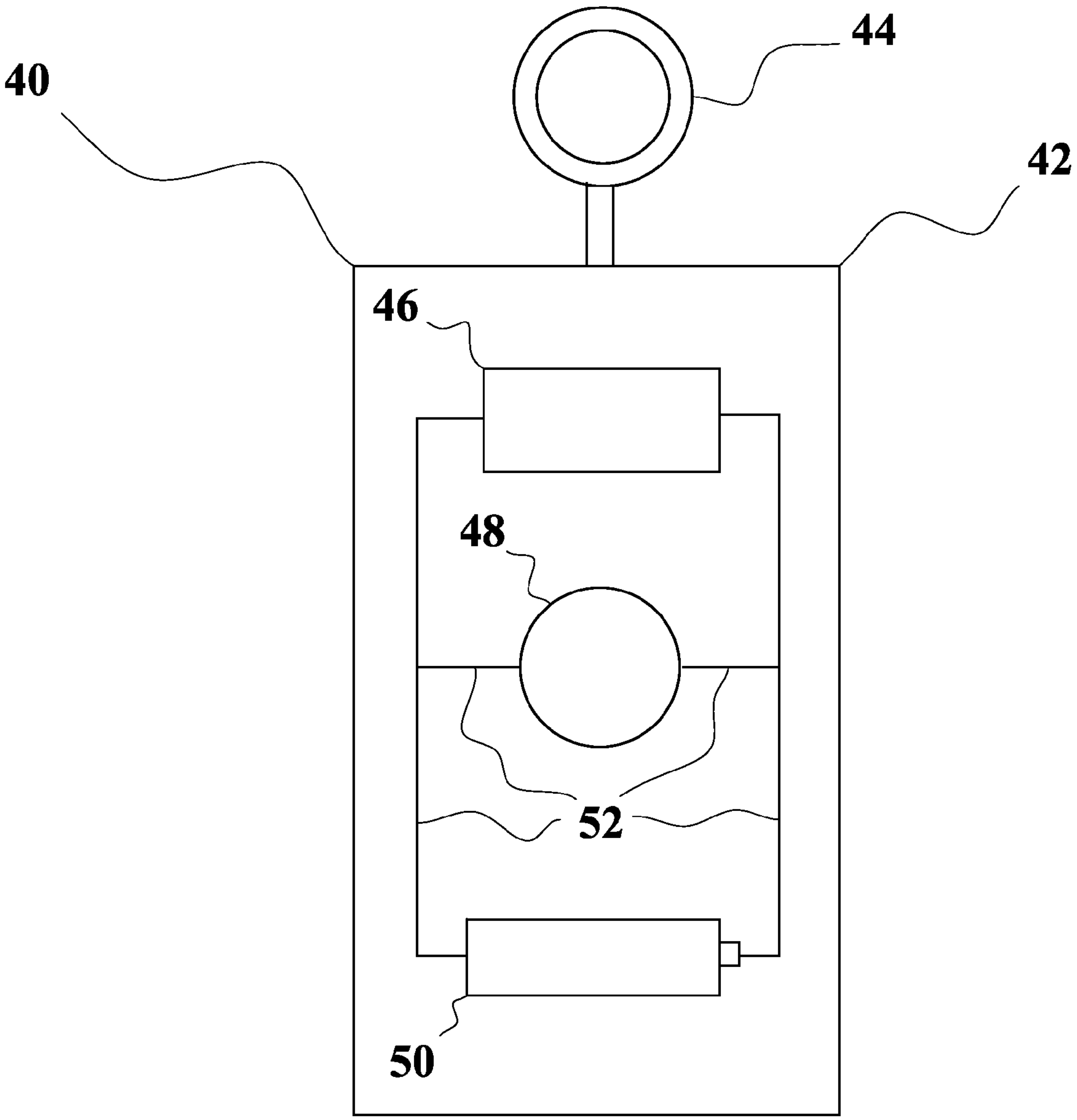
FIG. 3 is a schematic diagram of the first receiver/indicator used in the first and fifth embodiments of the invention.

FIG. 3 is a schematic diagram of the first receiver/indicator 40 used in the first and fifth embodiments of the invention, including a rectangular housing 42, a ring 44 by which it may be attached to a key ring, a BLUETOOTH (or other suitable) receiver 46, a red (or other) light 48, a battery 50, and wires 52. When the receiver receives the signal from the transmitter that cap/container interface pressure or vapor pressure has dropped below the predetermined level, it causes the light to flash. The battery supplies power to the receiver and the light. The wires electrically connect the battery, the receiver and the light. The light, of course, is in the surface of the housing, so that it is externally visible.

Figure 4:
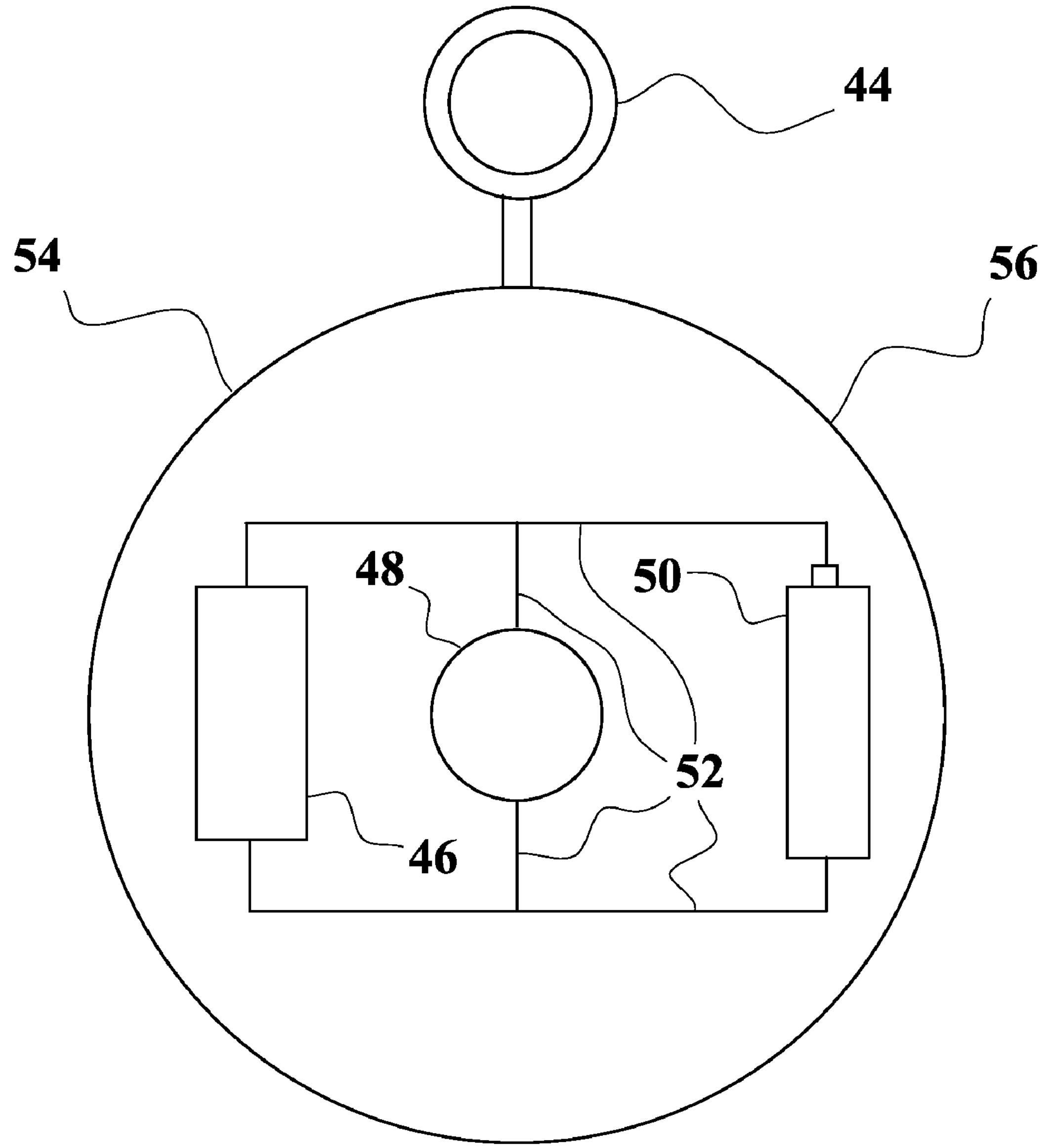
FIG. 4 is a schematic diagram of the second receiver/indicator used in the second and sixth embodiments of the invention.

FIG. 4 is a schematic diagram of the second receiver/indicator 54 used in the second and sixth embodiments of the invention which is the same as the first receiver/indicator, except that it has an a spherical housing 56, with the light 48 in a central position on the housing's surface.

Figure 5:
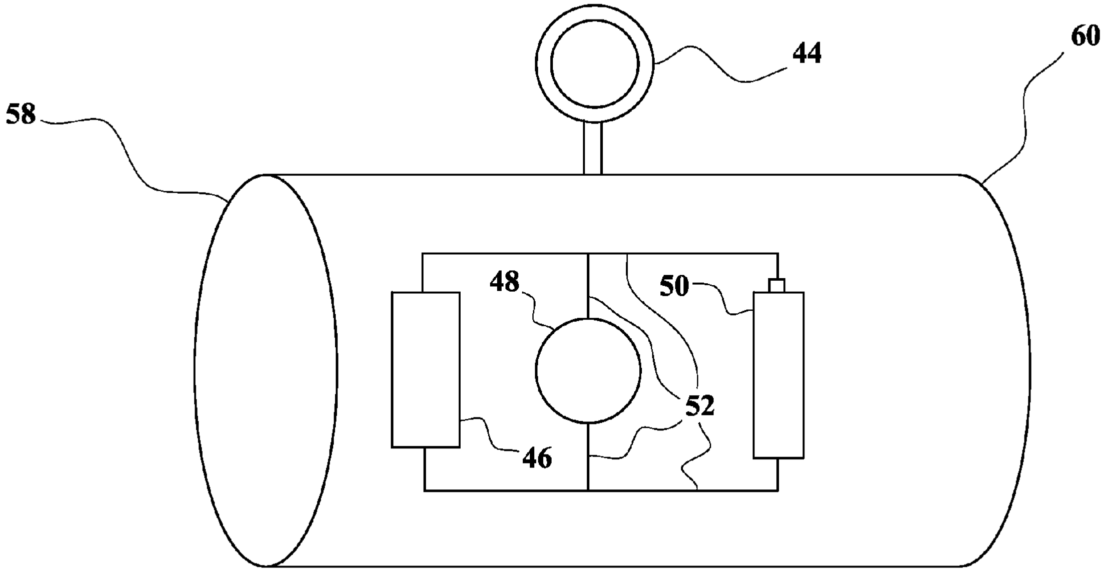
FIG. 5 is a schematic diagram of the third receiver/indicator used in the third and seventh embodiments of the invention.

FIG. 5 is a schematic diagram of the third receiver/indicator 58 used in the third and seventh embodiments of the invention, which is the same as the first receiver/indicator, except that it has a cylindrical housing 60, with the light 48 in a central position on the housing's surface.

Figure 6:
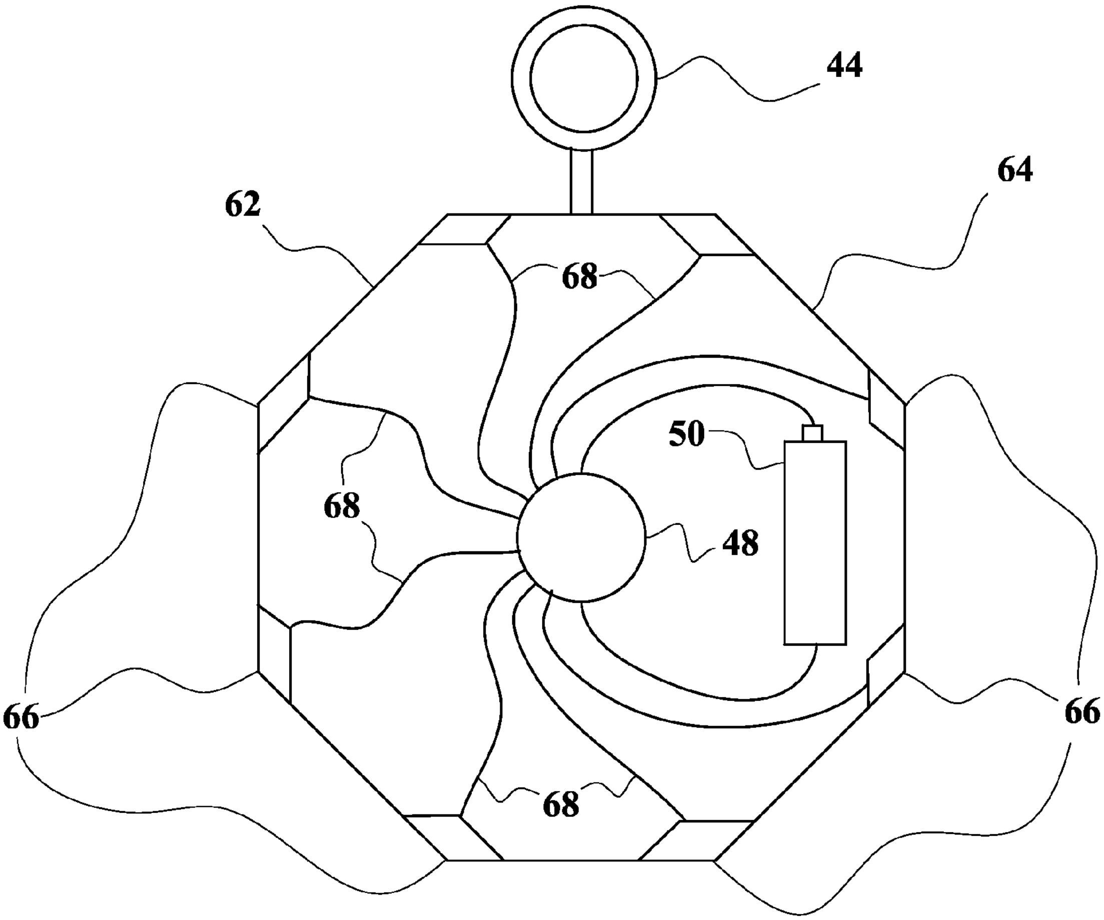
FIG. 6 is a schematic diagram of the fourth receiver/indicator used in the fourth and eighth embodiments of the invention. Similar reference characters denote corresponding features consistently throughout the attached drawings.

FIG. 6 is a schematic diagram of the fourth receiver/indicator 62 used in the fourth and eighth embodiments of the invention, which is the same as the first receiver/indicator, except that it has a polygonal housing 64, with the light 48 in a central position on the housing's surface, receivers 66 at each vertex of the polygon, and multiple wires 68 that electrically connect the battery, the receivers and the light.

Alternatively, for any of the eight preferred embodiments, the BLUETOOTH (or other) devices in the sensor/transmitter and receiver/indicator may both receive and transmit, and the user may press a button on the receiver/indicator that will send a query signal to the sensor/transmitter, causing the latter to send back a signal indicating either that cap/container interface or vapor pressure was or was not below the predetermined level, or a numerical indication of the pressure that would be displayed on the sensor/transmitter.

Alternatively, the gaskets may be made of any suitable material, besides rubber. The light may display different colors, rather than flashing. A device producing a sound, vibration, or any other humanly perceivable notice may be substituted for the light. The second sensor/transmitter may be dropped into the fuel tank. The drop in version might also send a signal to the receiver/indicator showing how full the tank was to prevent overfilling it, which could be useful for motorcycles and snowmobiles that do not have dashboard fuel indicators, or in filling a gas can. Whether or not the cap/container interface or vapor pressure was below the predetermined level could be indicated on the fuel cap itself, e.g., by a wheel that turns with change of pressure, with a green area indicated pressure was O.K., and a red area indicating low pressure, with the green or red area being displayed through a window in the fuel cap. A lever may be required to be pushed to cause the pressure to be measured and displayed. The cap may also emit a sound indicating when it has been screwed to the correct tightness, when being replaced to close the tank after refueling. There may be an alarm when it has not been screwed to the correct tightness. Inside of the door covering the fuel cap there may be a marking (original or later applied) indicated the correct position to which the fuel cap should be rotated to close it and seal the fuel tank. The fuel cap may have a movable washer that could seal the fuel cap when it was loose, which could be activated by a signal from the receiver/indicator, when the user pushes a button on the latter.

More broadly, the present invention relates to any way of indicating pressure between an opening of a fuel tank and a cap for the tank, including mechanical, electrical, magnetic or biological means. (Mechanical means could have the advantage of not risking ignition of vapor, as may be the case for electrical means. Biological means could be biological material that changes color under pressure.) A diaphragm attached at its circumference to the inside lower rim of a fuel cap could be used to indicate pressure in the opening of the fuel tank. The diaphragm would be flat when the cap was removed. When the cap was attached with proper interface tightness, the diaphragm would be concave (bend downward in its center) due to a partial vacuum in the tank. When there was a leak in the fuel tank, increased pressure from air (or any other gas) entering the tank would cause the diaphragm to be convex (bend upward in its center). When contact points at the top center of the diaphragm and the inside center of the cap contacted because of the diaphragm's convexity, that could set off a light and/or sound alarm to warn of the lack of proper pressure. Alternatively, movement of the diaphragm could cause movement of a color-coded indicator, with the color reflected by mirrors and/or magnified by a lens.

It is to be understood that the present invention is not limited to the embodiments described above, but encompasses any and all embodiments within the scope of the following claims.

We claim:

1. A pressure indicator for a fuel tank, comprising:

pressure sensors, processing chips, transmitters, batteries and wires in a component selected from the group comprising gaskets and washers for a cap that closes an opening of a fuel tank;

wherein the processing chips cause the transmitters to send a signal to a receiver when the sensors detect that pressure in a fuel tank is below a predetermined level, the batteries supply power to the sensors, the processing chips and the transmitters, and the wires electrically connect the batteries, the sensors, the processing chips, and the transmitters; and when the signal is received by the receiver, whether or not the pressure in the fuel tank is below the predetermined level is indicated on a fuel cap, by a wheel that turns with change of Pressure, said wheel having a red area indicating low pressure, and a green area indicating normal pressure, with the red or green area being displayed through a window in the fuel cap;

wherein the fuel cap emits a sound indicating when it has been screwed to a correct tightness, when being replaced to cover the fuel tank after refueling;

wherein there is an alarm when the fuel cap has no been screwed to a correct tightness;

wherein inside of a door covering the fuel cap there is a marking indicating the correct position to which the fuel cap should be rotated to close it and seal the fuel tank; and wherein there is a movable washer in the fuel cap that can seal the fuel cap when it is loose, said movable washer being activated when a user pushes a button after an indicator shows that the fuel cap is loose after the receiver receives the signal.

2. The pressure indicator for a fuel tank according to claim 1, wherein the pressure sensors in the component measure pressure between a lip of an opening of the fuel tank and the cap that closes the opening.

3. The pressure indicator for a fuel tank according to claim 1, wherein the pressure sensors measure vapor pressure within the fuel tank.

4. The pressure indicator for a fuel tank according to claim 1, wherein:

the fuel tank is in a motor vehicle.

5. The pressure indicator for a fuel tank according to claim 1, wherein:

the gasket is made of rubber.

6. The pressure indicator for a fuel tank according to claim 1, wherein:

the component is a gasket in the cap for the fuel tank.

7. The pressure indicator for a fuel tank according to claim 1, wherein:

the component is a gasket in the opening of the fuel tank.

8. The pressure indicator for a fuel tank according to claim 1, wherein:

BLUETOOTH technology is used to send the signal.

9. The pressure indicator for a fuel tank according to claim 1, wherein:

the receiver is in a key ring attachment.

10. A pressure indicator for a fuel tank, comprising:

pressure sensors, processing chips, transmitters, batteries and wires in a component selected from the group comprising gaskets and washers for a cap that closes an opening of a fuel tank;

wherein the processing chips cause the transmitters to send a signal to a receiver when the sensors detect that pressure in a fuel tank is below a predetermined level, the batteries supply power to the sensors, the processing chips and the transmitters, and the wires electrically connect the batteries, the sensors, the processing chips, and the transmitters; and means for providing a humanly perceivable notice when the signal is received by the receiver;

wherein the cap emits a sound indicating when it has been screwed to a correct tightness; and where an alarm is sounded when the cap is not screwed to the correct tightness;

wherein there is a movable washer in the fuel cap that can seal the fuel cap when it is loose, said movable washer being activated when a user pushes a button after an indicator shows that the fuel cap is loose after the receiver receives the signal.

11. The pressure indicator for a fuel tank according to claim 10, wherein the pressure sensors measure pressure on the component.

12. The pressure indicator for a fuel tank according to claim 10, wherein the pressure sensors measure vapor pressure within the fuel tank.

13. The pressure indicator for a fuel tank according to claim 10, wherein:

the fuel tank is in a motor vehicle.

14. The pressure indicator for a fuel tank according to claim 10, wherein:

BLUETOOTH technology is used to send the signal.

15. The pressure indicator for a fuel tank according to claim 10, wherein:

the receiver is in a key ring attachment.

16. The pressure indicator for a fuel tank according to claim 10, wherein:

the humanly perceivable notice is a flashing light.

17. The pressure indicator for a fuel tank according to claim 10, wherein:

the humanly perceivable notice is selected from the group comprising sounds and vibrations.

* * * * *